(12) United States Patent
Pasanen et al.

(10) Patent No.: US 7,756,119 B2
(45) Date of Patent: Jul. 13, 2010

(54) TERMINAL INITIATED CONTEXT PRESERVATION

(75) Inventors: Juha Pasanen, Espoo (FI); Pekka Anttalainen, Helsinki (FI)

(73) Assignee: Nokia Corporation, Espoo (FI)

( * ) Notice: Subject to any disclaimer, the term of this patent is extended or adjusted under 35 U.S.C. 154(b) by 524 days.

(21) Appl. No.: 11/739,605

(22) Filed: Apr. 24, 2007

(65) Prior Publication Data

US 2008/0267143 A1    Oct. 30, 2008

(51) Int. Cl.
*H04W 76/04*    (2009.01)

(52) U.S. Cl. ...................................... 370/352
(58) Field of Classification Search ............... 370/352
See application file for complete search history.

(56) References Cited

U.S. PATENT DOCUMENTS

2004/0052246 A1* 3/2004 Jang ........................... 370/352
2008/0013553 A1* 1/2008 Shaheen ...................... 370/401

OTHER PUBLICATIONS

"3GPP TS 23.060," Technical Specification Group Services and System Aspects, General Packet Radio Service (GPRS), V7.4.0, (Mar. 2007).*

* cited by examiner

*Primary Examiner*—Melvin Marcelo

(57) ABSTRACT

A method, a system, a network device, a terminal device, and computer programs for controlling a packet data protocol context in a mobile communication system. According to an example embodiment, an enhanced context modification request may be generated at a terminal device of the mobile communication system by adding a preservation information indicating a desired preservation of a packet data protocol context. The enhanced context modification request may be transmitted towards a core network of the mobile communication system, and a context-related decision may be controlled at the core network based on the preservation information.

13 Claims, 4 Drawing Sheets

TERMINAL INITIATED CONTEXT PRESERVATION

FIELD

The present disclosure relates to a method, network device, terminal device and computer programs for controlling a packet data protocol (PDP) context in a network supporting packet switched transmission of data units, such as for example a General Packet Radio Services (GPRS) or Universal Mobile Telecommunications System (UMTS) network.

BACKGROUND

In common mobile communication networks two main techniques for a data transmission are used: circuit switched data transmission and packet switched data transmission. In the circuit switched domain a network establishes an interconnection for data transmission by allocating a radio channel to a mobile station, when a network host or service provider intends to transmit data via the network. Then data is transmitted via the network after the interconnection has been established. The radio channel is occupied by the mobile station during the entire duration of the interconnection, even though in many cases only a small amount of data has to be transmitted. However, regularly a subscriber is charged for the entire duration of the interconnection. This type of circuit switched data transmission is used in GSM (Global System for Mobile communications) networks.

In the packet switched domain the network transmits a data packet only when required, i.e. when data transmission has to be carried out. Thus, several mobile stations can use the same radio channel at a time. If a mobile station generates a data packet, the network routes that packet via a first unattached radio channel to a recipient. Thus, as data transmission frequently consists of data bursts, the radio channels can be used in an efficient manner. This type of packet switched data transmission is used in GPRS (General Packet Radio Service) and UMTS systems.

Recent packet data terminal devices (or user equipments (UEs) in $3^{rd}$ generation (3G) mobile communication terminology) enable access to the Internet and to intranets. Therefore, the GPRS data transmission uses particularly the internet protocol (IP). If a mobile station is attached to a GPRS system and a PDP (Packet Data Protocol) context is activated, a terminal equipment is able to send data packets via the mobile station to the uplink. Vice versa, a host can use the downlink to send data packets to the terminal equipment. These data packets are routed by a gateway GPRS support node (GGSN) and a serving GPRS support node (SGSN) to the correct addresses.

However, before sending data packets the mobile station has to carry out a GPRS attach and a PDP context activation. The GPRS attach informs the network that the mobile station is available. The attach is established by the mobile station and the SGSN. Furthermore, after the GPRS attach is established, the mobile station carries out a PDP context activation. The PDP context activation makes the mobile station known to the corresponding GGSN. Thereupon, data transmission via the GGSN to external networks is enabled. Such PDP context activation may be requested by either the network or the mobile station.

In UMTS systems, a PDP context preservation functionality is provided which enables the core network (CN), e.g. an SGSN, to release corresponding radio access bearers (RABs) of a UE or the whole signaling connection of the UE, but keeps the PDP context in active state. I.e., the PDP context remains active in UE and in the CN, although the corresponding RAB resources are released. In general, the term "radio access bearer" may be used to identify a service the so-called access stratum (AS) provides to the so-called non access stratum for transfer of user data between the UE and the CN. The NAS is a functional layer running between the UE and the CN. The layer supports traffic and signaling messages between the CN and the UE. The function of the AS is to support the NAS. This includes the functions and protocols for the transport of information across the access network (e.g. UMTS Terrestrial Radio Access Network (UTRAN)) and the air interface.

Furthermore, the Iu interface is an open Interface connecting the UTRAN to the CN. The function of the Iu interface includes split responsibility and services towards the CN, handles time alignments, error control, initialization etc. The Iub interface is located between a radio network controller (RNC) and a base station (or "Node-B" in 3G terminology). Via the Iub interface, the RNC controls the Node-B. For example, the RNC allows the negotiating of radio resources, adding and deleting of cells controlled by the individual Node-B, or supporting the different communication and control links. One Node-B can serve one or multiple cells.

Paging channel (PCH) states allow the UE to go back to sleep and just be awake periodically to receive incoming pages and/or perform cell update procedures if the neighboring cell quality exceeds the serving cell quality by a certain threshold. In these states, no user data transfer can take place.

The PDP context preservation can be triggered only by a RAB release request procedure or by a Iu release request procedure initiated by the RAN. So far, the UE has no proper way to trigger an RAB or Iu release without PDP context deactivation. Thus, in order to release a RAB or Iu, the UE can only use a PDP context deactivation procedure or a GPRS detach procedure (which causes automatic context deactivation). PDP context related procedures are described in more detail in the 3GPP specifications 24.008 V7.6.0. (2006-12). GPRS detach procedures are described in more detail in the 3GPP specifications 23.060 V7.3.0. (2006-12).

To keep PDP context(s) active, some UEs may be driven to use a radio resource context (RRC) signaling connection release indication procedure is described in the 3GPP specification 25.331, which forces the network to release the whole signaling connection (over Iu and evidently also over the Iub interface). However, if many UEs use this method, it may cause network problems or at least a huge amount of useless signaling. As an example, some UEs or services (e.g. Blackberry) have used the RRC signaling connection release indication procedure. Motivations behind this could be e.g. that such UEs have not implemented mandatory PCH states at all and/or one brutal way to save battery of the UE in a network which does not support PCH states. However, PCH states will be even more crucial for the 3G networks in the future and also for network strategy.

SUMMARY

According to an example embodiment, a method may include generating an enhanced context modification request at a terminal device of a mobile communication system by adding a preservation information indicating a desired preservation of a packet data protocol context; and transmitting said enhanced context modification request towards a core network of said mobile communication system.

According to another example embodiment, a method may include receiving at a core network of a mobile communication system an enhanced context modification request to which a preservation information indicating a desired preservation of a packet data protocol context has been added; and controlling a context-related decision at said core network based on said preservation information.

According to another example embodiment, an apparatus or network device may include detecting unit configured to detect a preservation information in an enhanced context modification request received by said network device (or apparatus); and a decision unit configured to control a context-related decision based on said preservation information.

According to yet another example embodiment, a terminal device may include an evaluation unit configured to generate an enhanced context modification request by adding a preservation information if it is determined at said terminal device that a packet data protocol context is to be preserved; and a transmission unit configured to transmit said enhanced context modification request towards a core network of a mobile communication system to which said terminal device is coupled.

In addition, according to another example embodiment, a system may include at least one terminal device as defined above and at least one network device as defined above, and by computer programs comprising code means for producing the respective functionalities of the above terminal and network devices, when run on a computing or processing device.

Accordingly, the terminal device (e.g. UE, mobile phone, mobile terminal, mobile station etc.) may be provided with a capability to ask for a bearer release without network detach or context deactivation, e.g., the context may be preserved active, although the corresponding radio bearer is released. Additionally, the network may be allowed to keep the main control over the context-related decision, e.g., whether to tear down the signaling connection or to keep it and exploit other possibilities (e.g. PCH states) in order to save network resources and battery of the terminal device.

Furthermore, risk can be prevented (or at least decreased) that terminal devices will irresponsibly use a signaling connection release indication procedures which force the network to release the whole signaling connection and may cause network problems or at least useless overhead signaling (e.g. by release, re-setup, security procedures, small payload, release, etc. with possibly pretty short cycle). Thus, if the network can decide to keep a signaling connection, then there is less useless overhead signaling, faster call setup, and saved capacity available for chargeable payload.

The context-related decision may be controlled by a serving node of the terminal device, e.g. a serving GPRS support node (SGSN).

In an embodiment, the enhanced context modification request can be a Modify PDP Context request. In this exemplary case, the preservation information may be added to the Modify PDP Context request as an optional information element.

Furthermore, in an embodiment, the context-related decision may comprise keeping a related packet data protocol context active and releasing a related radio access bearer of said terminal device. Optionally, a decision as to a release of the related signaling connection of said terminal device may then be transferred to a radio access network of the mobile communication system. Furthermore, the context-related decision may comprise keeping a related packet data protocol context active and releasing the related signaling connection of said terminal device if no radio access bearer would remain after a bearer release.

A bearer or connection release may be used or interpreted as an acknowledgement to the enhanced context modification request.

Advantageous developments are defined in the dependent claims.

BRIEF DESCRIPTION OF THE DRAWINGS

Various embodiments will now be described in greater detail with reference to the accompanying drawings, in which.

DESCRIPTION OF EXAMPLE EMBODIMENTS

Figure 1:
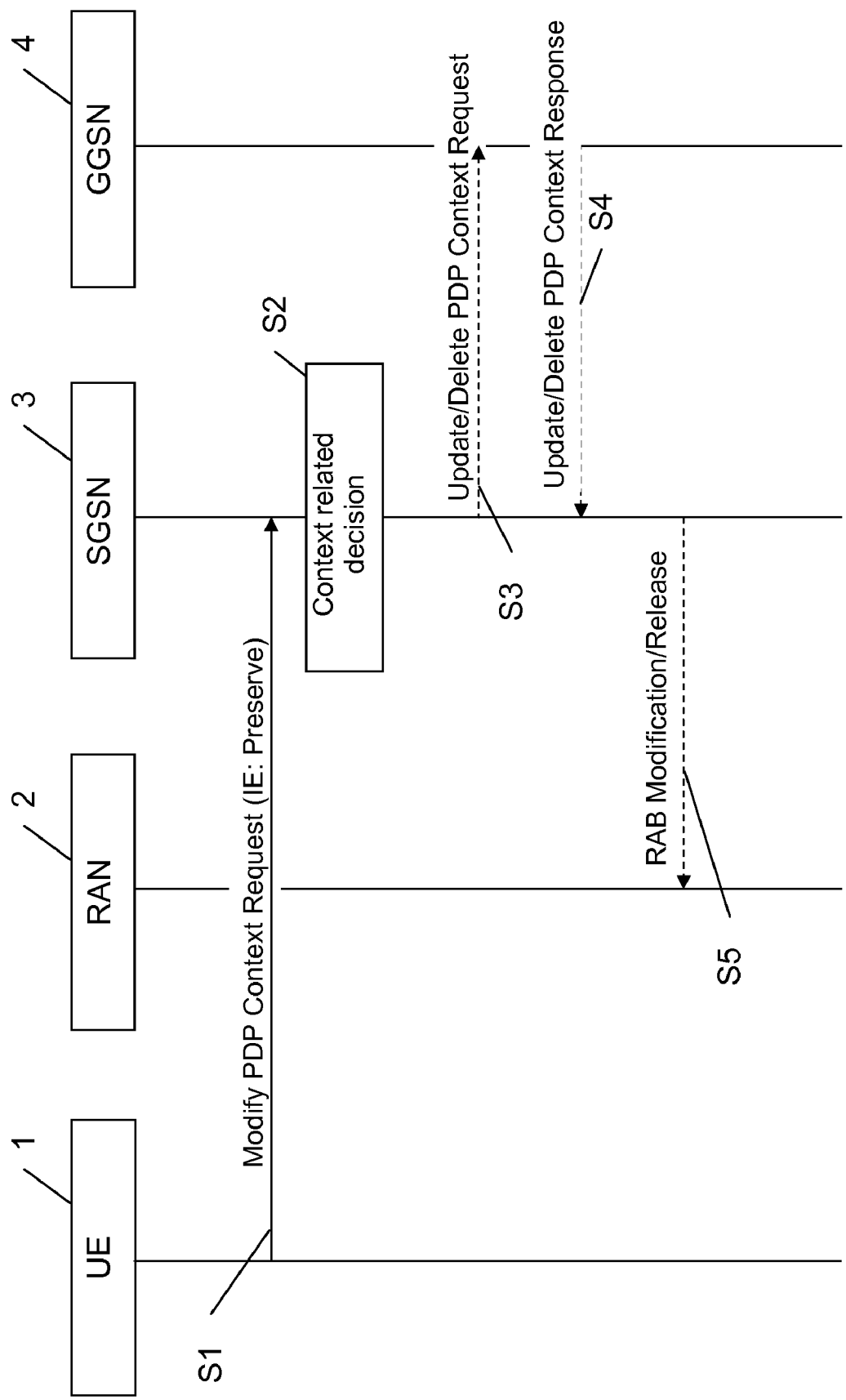
FIG. 1 shows a network requested PDP context modification procedure according to an example embodiment.

The following description of various embodiments is based on an enhanced context modification procedure in a UMTS based mobile communication system.

The PDP context modification procedure can be invoked by the network or by the terminal device (e.g. UE), in order to change the quality of service (QoS) negotiated, the radio priority level, or the TFT negotiated during the PDP context activation procedure, the secondary PDP context activation procedure or previously performed PDP context modification procedures. The terminal device may also create and delete a TFT in an active PDP context. The procedure can be initiated by the network or the MS at any time when a PDP context is active. The PDP context modification procedure may be invoked by the terminal device, in order to upgrade the maximum bit rate and to trigger the re-establishment of the radio access bearer for an activated PDP context which is preserved in the MS with maximum bit rate values of 0 kbit/s for both uplink and downlink (see 3GPP specification TS 23.060 V7.3.0. (2006-12) for further details).

In an embodiment, it is suggested providing an additional trigger function for a PDP context preservation by a direct signaling from the UE to the CN, e.g. the SGSN. As the UE knows best its situation (coming inactivity, other services used etc.), it would be useful if the UE would have possibility to request the CN to modify a PDP context so that the CN (and UE) would preserve the PDP context. The preservation procedure allows active PDP contexts associated with the released RABs to be preserved in the CN, and the RABs can then be re-established at a later stage.

When the CN (e.g. the allocated SGSN) receives such a preservation request, the network has all the control how to react. E.g., while keeping the PDP context still active, network may release the corresponding RAB only (RAB release) or release the whole signaling connection (Iu release), if no RABs would remain and CN sees not wise to keep the signaling connection without RABs. In above first case (RAB release only, no Iu Release), the CN is able to transfer the decision control (to keep or to release the signaling connection) to the radio access network (RAN) to decide.

For example, a new optional information "preserve" could be added into the corresponding context modification request message. In the specific example of 3GPP specification 24.008 V7.3.0. (2006-12), it could be added as a new optional information element (IE) to the Modify PDP Context request (terminal to network) or into a corresponding NAS message.

If the UE wants to preserve the context active, but release the corresponding radio bearer, the UE sends context modification request to the CN (e.g. SGSN or corresponding serving network device or node) with the additional preservation information (e.g. "preserve").

When the CN receives such a preservation request, it keeps the PDP context active and by implementing its own strategy releases the corresponding RAB only (RAB release) or release the whole signaling connection (Iu release, which automatically means also RAB release).

In this proposed preservation request case, there is not necessarily any need to have acknowledgement on NAS level (e.g. Modify PDP context accept from the network towards the terminal device), but RAB/Iu release on RAN Application Part (RANAP) protocol level (described in 3GPP specification 25.413) and furthermore RRC protocol level (described in 3GPP specification 25.331 V7.3.0. (2006-12)) could be enough.

FIG. 1 shows a specific example of the proposed terminal initiated PDP context modification procedure with a packet switched attached terminal device embodied as a user equipment (UE) 1 for use in the UMTS system. Furthermore, a network device is provided as a part of the UMTS system, the network device being embodied as a support node (SN) namely a GPRS support node (GSN), in particular as a gateway GSN (GGSN) 4. The GGSN 4 is a node that is accessed by a packet data network due to the evaluation of a PDP address. It contains routing information for attached GPRS users. The routing information is used to tunnel packet data units to the UE's current point of attachment, i.e. a serving GSN (SGSN) 3. The GGSN 4 may request location information from a data base, namely a home locator register (HLR, not shown).

The SGSN 3 is a node that is serving the UE 1. The SGSN 3 supports GPRS and/or UMTS. At GPRS attach, the SGSN 3 establishes a mobility management context containing information pertaining to e.g., mobility and security for the UE 1. At PDP context activation, the SGSN 3 establishes a PDP context, to be used for routing purposes, with the GGSN 4 that the subscriber will be using.

The SGSN 3 and GGSN 4 functionalities may be combined in the same physical node, or they may reside in different physical nodes. SGSN 3 and GGSN 4 contain IP or other routing functionality, and they may be interconnected with IP routers. When SGSN 3 and GGSN 4 are arranged in different networks, they are interconnected via a suitable interface, namely a so-called Gp interface.

A terminal-initiated context preservation procedure according to an embodiment is described hereinafter with reference to FIG. 1.

In order to initiate the proposed context modification procedure, the UE 1 sends in step S1 a Modify PDP Context Request message with the added information element "Preserve" to the network, enters the state PDP-Modify-Pending and starts a timer. The message may additionally contain at least one of a requested new QoS, a traffic flow template (TFT) and a requested logical link control protocol service access point identifier (LLC SAPI).

Upon receipt of the Modify PDP Context Request message, the network (e.g. SGSN 3) may optionally reply with a Modify PDP Context Accept message (not shown in FIG. 1) in order to accept the context modification. The reply message may contain the negotiated QoS and the radio priority level based on the new QoS profile and the negotiated LLC SAPI, that shall be used by the logical link. However, as already indicated above, the mere RAB/Iu release could be enough. Upon receipt of the Modify PDP Context Accept message or upon the RAB/Iu release (see later step S5), the UE 1 can stop the timer T3381.

Then, in step S2, the SGSN 3 initiates a context-related decision as described above based on its own available information under consideration of the preservation request received from the UE 1 in the enhanced Modify PDP Context Request message. If additional context modification information is included in the modification request, the SGSN 3 may send in step S3 an Update or Delete PDP Context Request message to the GGSN 4. If QoS negotiated and/or TFT received from the SGSN 3 is incompatible with the PDP context being modified, the GGSN 4 rejects the Update PDP Context Request. Otherwise, the GGSN 4 stores the negotiated QoS, stores, modifies, or deletes TFT of that PDP context as indicated in the TFT, and returns an Update PDP Context Response message in step S4.

Based on the context-related decision in step S2, the SGSN 3 may perform in step S5 a radio access bearer modification or release by an RAB assignment procedure. The SGSN 3 thus keeps the PDP context active and by implementing its own strategy releases the corresponding RAB only (RAB release) or release the whole signaling connection (Iu release, which automatically means also RAB release).

Figure 2:
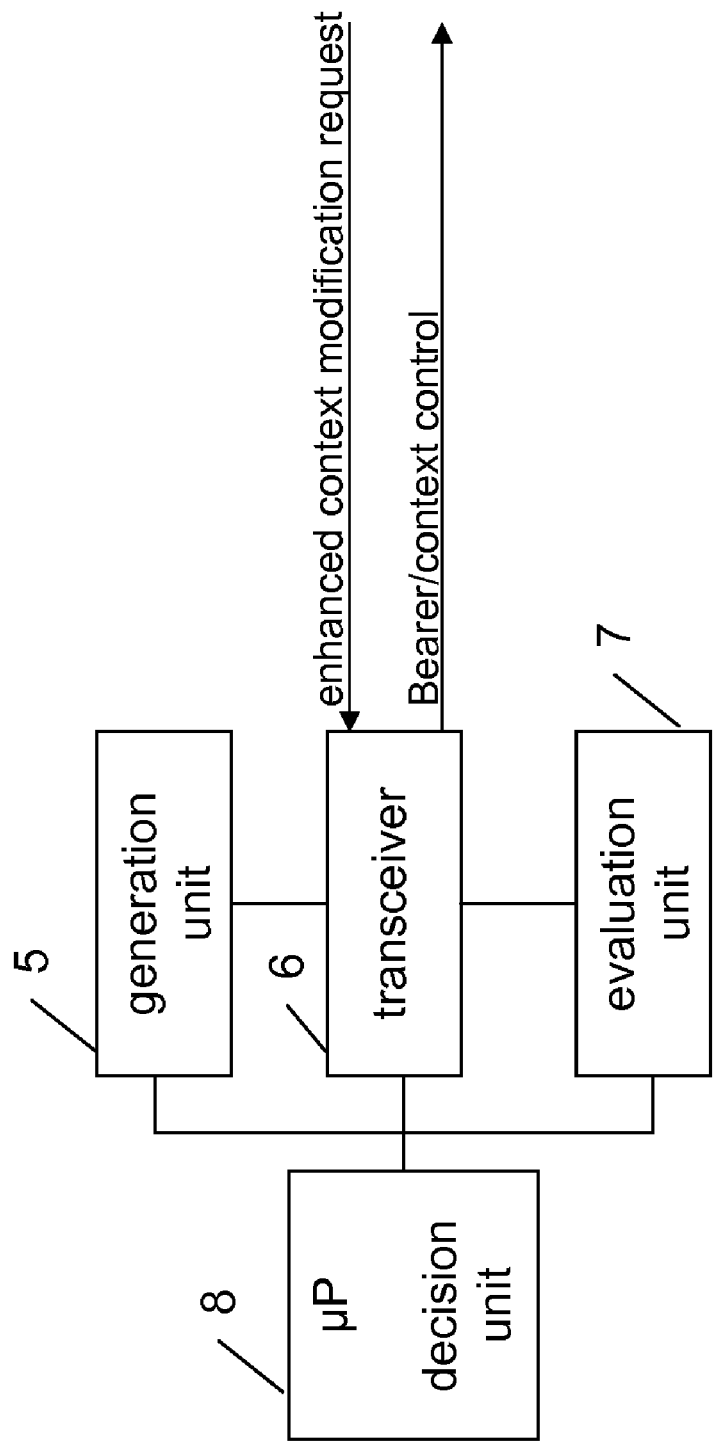
FIG. 2 shows a schematic block diagram of a network device according an example embodiment.

FIG. 2 shows a schematic block diagram of a network device according to an embodiment implementing the functionalities of a serving node, e.g. the SGSN 3, for controlling the modification of a PDP context. This network device comprises a generation unit 5 such as a programmable microcontroller, integrated circuit or functionality for generating a control signaling or messages required for bearer-related control and context-related control. The generation unit 5 is connected with a transceiver 6 for sending the generated control signaling or messages. The enhanced context modification request with the preservation information is received by the transceiver 6 and evaluated by an evaluation unit 7 such as a programmable microcontroller, integrated circuit or functionality being connected to the transceiver 6. The evaluation unit 7 is designed for evaluating the context modification request received by the transceiver 6 with regard to the preservation information (e.g. IE: Preserve) that indicates a terminal-initiated context preservation request. According to the preservation information referring to the context preservation desired by the sending UE, a decision unit 8 such as a microprocessor decides based on the evaluation of the evaluation unit 7 on its context-related strategy. The microprocessor 8 is connected with the generation unit 5, the transceiver 6 and the evaluation unit 7 in order to coordinate the actions taken by these units/devices.

Figure 3:
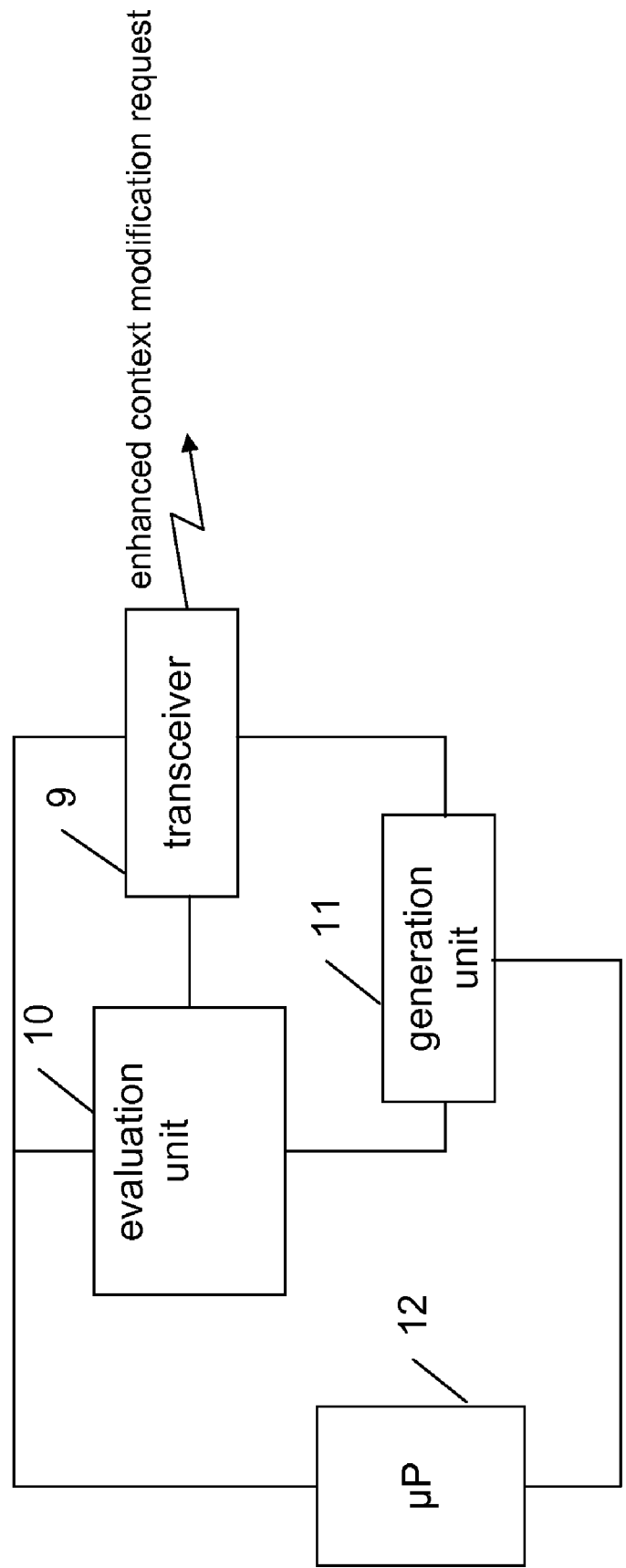
FIG. 3 shows a schematic block diagram of a terminal device according to a example embodiment.

FIG. 3 shows a schematic block diagram of a terminal device, such as the UE 1 provided with the proposed ability to generate the enhanced context modification request and thus ask for a context preservation. This terminal device comprises a transceiver 9 for transmitting an enhanced context modification request. The transceiver 9 is connected to an evaluation unit 10 such as a programmable microcontroller, integrated circuit or functionality being designed for evaluating the current status or situation (e.g. upcoming inactivity, other service(s) used, etc.) and providing corresponding status information to a decision unit 11 such as a programmable microcontroller, integrated circuit or functionality being connected to the evaluation unit 10. The decision unit 11 is programmed to decide whether or not to generate an enhanced context modification request to ask for context preservation on the basis of the received status information. If the decision is positive, i.e. if a PDP context preservation shall be asked for, a corresponding enhanced context modification request is sent via a connection between the decision unit 11 and the transceiver 9 to the transceiver 9 and then to the SGSN 3. The transceiver 9, the evaluation unit 10 and the decision unit 11 are connected to a microprocessor 12 coordinating the actions between these units/devices.

Figure 4:
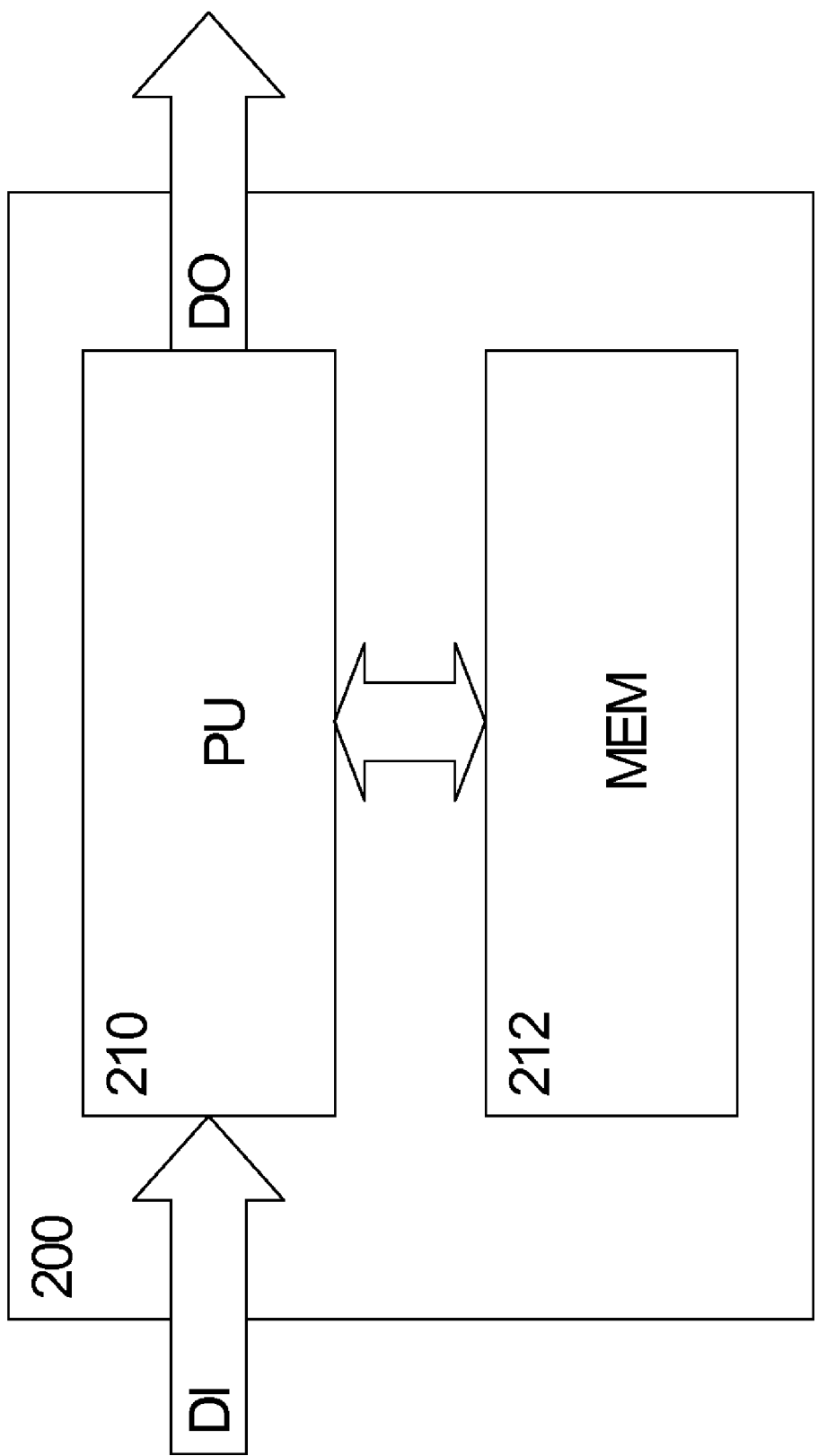
FIG. 4 shows a schematic block diagram of a software-based implementation of an example embodiment.

FIG. 4 shows a schematic block diagram of a software-based embodiment of the proposed functionalities for achieving a terminal-initiated context preservation procedure. The required functionalities can be implemented in a processing module 200 with a processing unit 210, which may be any processor or computer device with a control unit which performs control based on software routines of a control program stored in a memory 212. Program code instructions are fetched from the memory 212 and are loaded to the control unit of the processing unit 210 in order to perform the processing steps of the above terminal-side and network-side functionalities of blocks 5 to 12 as described in the block diagrams of FIGS. 2 and 3, respectively. These processing steps may be performed on the basis of input data DI and may generate output data DO, wherein the input data DI may correspond to status or situation parameters on the terminal side (e.g. UE 1) or a context modification request on the network side (e.g. SGSN 3), and the output data DO may correspond to the enhanced context modification request on the terminal side or the bearer-related and context-related signaling on the network side.

The proposed terminal-initiated context preservation helps the network to keep the main control in deciding whether to tear down the signaling connection between the terminal device and the network or to keep it and exploit e.g. PCH states in order to save network resources and battery of the terminal device. The terminal device has thus better control over its context and bearer resources and the network has better control to all its resources and usage of different terminal states (e.g. PCH states) etc. The terminal device is provided with a capability to ask for bearer release without network detach or context deactivation, i.e. to preserve its context active, although the corresponding bearer is released.

To summarize, a method, a system, a network device, a terminal device, and computer programs for controlling a packet data protocol context in a mobile communication system have been described. An enhanced context modification request is generated at a terminal device of the mobile communication system by adding a preservation information indicating a desired preservation of a packet data protocol context. The enhanced context modification is transmitted request towards a core network of the mobile communication system, and a context-related decision is controlled at the core network based on the preservation information.

It is noted that the present disclosure is not restricted to the above described example embodiments. In particular, the serving network device may be any device configured to control the context of a terminal device. Moreover, any context modification procedure may be used by the terminal device to ask for a context preservation by adding a corresponding information element, e.g., word, byte, or even only a 1-bit flag. Thus, the preferred embodiment may vary within the scope of the attached claims.

The invention claimed is:

1. A method comprising:
    a) making a context related decision that an enhanced context modification request is to be sent from a terminal device of a mobile communication system based on at least one of upcoming inactivity or services currently in use;
    b) generating an enhanced context modification request at said terminal device by adding a preservation information indicating a desired preservation of a packet data protocol context; and
    c) transmitting said enhanced context modification request towards a core network of said mobile communication system.

2. The method of claim 1, wherein said context-related decision is controlled by a serving node of said terminal device.

3. The method of claim 2, wherein said serving node is a serving GPRS support node.

4. The method of claim 1, wherein said enhanced context modification request is a Modify PDP Context request.

5. The method of claim 4, wherein said preservation information is added to said Modify PDP Context request as an optional information element.

6. The method of claim 1, further comprising using a bearer or connection release as an acknowledgement to said enhanced context modification request.

7. A terminal device comprising:
    a) a decision unit configured to make a context-based decision that an enhanced context modification request is to be sent based on at least one of upcoming inactivity or services currently in use;
    b) an evaluation unit configured to generate an enhanced context modification request by adding a preservation information if it is determined at said terminal device that a packet data protocol context is to be preserved; and
    c) a transmission unit configured to transmit said enhanced context modification request towards a core network of a mobile communication system to which said terminal device is connected.

8. The terminal device of claim 7, wherein said enhanced context modification request is a Modify PDP Context request.

9. The terminal device of claim 8, wherein said evaluation unit is configured to add said preservation information to said Modify PDP Context request as an optional information element.

10. The terminal device of claim 9, wherein said optional information element is at least one bit.

11. A communication system comprising at least one network device comprising a detection unit configured to detect a preservation information in an enhanced context modification request received by said network device; and a decision unit configured to control a context-related decision based on said preservation information; said communication system further comprising at least one terminal device comprising a decision unit configured to make a context-based decision that said enhanced context modification request is to be sent based on at least one of upcoming inactivity or services currently in use; an evaluation unit configured to generate said enhanced context modification request by adding a preservation information if it is determined at said terminal device that a packet data protocol context is to be preserved; and a transmission unit configured to transmit said enhanced context modification request towards a core network of said mobile communication system.

12. A terminal device comprising:
    a) decision means for making a context-based decision that an enhanced context modification request is to be sent based on at least one of upcoming inactivity or services currently in use;
    b) evaluation means for generating said enhanced context modification request by adding a preservation information if it is determined at said terminal device that a packet data protocol context is to be preserved; and c) transmission means for transmitting said enhanced context modification request towards a core network of a mobile communication system to which said terminal device is connected.

13. A storage medium having instructions stored thereon, the instructions, when executed by a processor are configured to:

make a context-based decision that an enhanced context modification request is to be sent from a terminal device of a mobile communication system based on at least one of upcoming inactivity or services currently in use; and generate said enhanced context modification request at said terminal device by adding a preservation information indicating a desired preservation of a packet data protocol context.

\* \* \* \* \*